(12) United States Patent
Jang

(10) Patent No.: US 7,804,895 B2
(45) Date of Patent: Sep. 28, 2010

(54) APPARATUS AND METHOD FOR DETECTING LETTER BOX, AND MPEG DECODING DEVICE HAVING THE SAME

(75) Inventor: Woo-Young Jang, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1526 days.

(21) Appl. No.: 11/137,279

(22) Filed: May 25, 2005

(65) Prior Publication Data

US 2005/0265460 A1    Dec. 1, 2005

(30) Foreign Application Priority Data

May 27, 2004    (KR)    ............. 10-2004-0037813

(51) Int. Cl.
H04B 1/66    (2006.01)

(52) U.S. Cl. ............. 375/240; 375/240.25; 375/240.26; 375/240.29; 375/240.13; 382/233; 382/235; 382/260; 382/263; 382/261; 382/262; 382/264

(58) Field of Classification Search ................ 375/240, 375/240.25, 240.26, 240.29, 240.13; 382/233, 382/235, 260, 263, 261, 262, 264
See application file for complete search history.

(56) References Cited

U.S. PATENT DOCUMENTS 5,381,183 A * 1/1995 Ishizuka et al. ............. 348/458
5,973,749 A * 10/1999 Ishii et al. .................... 348/558
6,256,045 B1 * 7/2001 Bae et al. ..................... 348/445
2005/0168639 A1    8/2005 Konuma ..................... 348/558

FOREIGN PATENT DOCUMENTS

| JP | 07-236125 | 9/1995 |
| JP | 08-65640 | 3/1996 |
| KR | 1998-068686 | 10/1998 |
| KR | 1998-079615 | 11/1998 |
| KR | 10-2002-0016569 | 3/2002 |

* cited by examiner

*Primary Examiner*—Shawn An
(74) *Attorney, Agent, or Firm*—Mills & Onello, LLP

(57) ABSTRACT

In a device and a method for detecting a letter box for an MPEG decoder, the method includes performing processing area filtering for selecting a processing area of an image used to detect the letter box; performing intra-macroblock filtering for determining the letter box area based on a change level of pixels in macroblocks in one line of the image from the processing area; performing impulse data filtering for excluding the line being detected a high frequency component from the determined letter box area; performing inter-macroblock filtering for determining the letter box area based on a change level of lines between macroblocks of the image; performing inter-line filtering for determining a boundary of the letter box based on an average of the pixel values of the lines; and performing inter-picture filtering for outputting a boundary value of the letter box that has the highest frequency number as the boundary of the letter box in successive images.

10 Claims, 8 Drawing Sheets

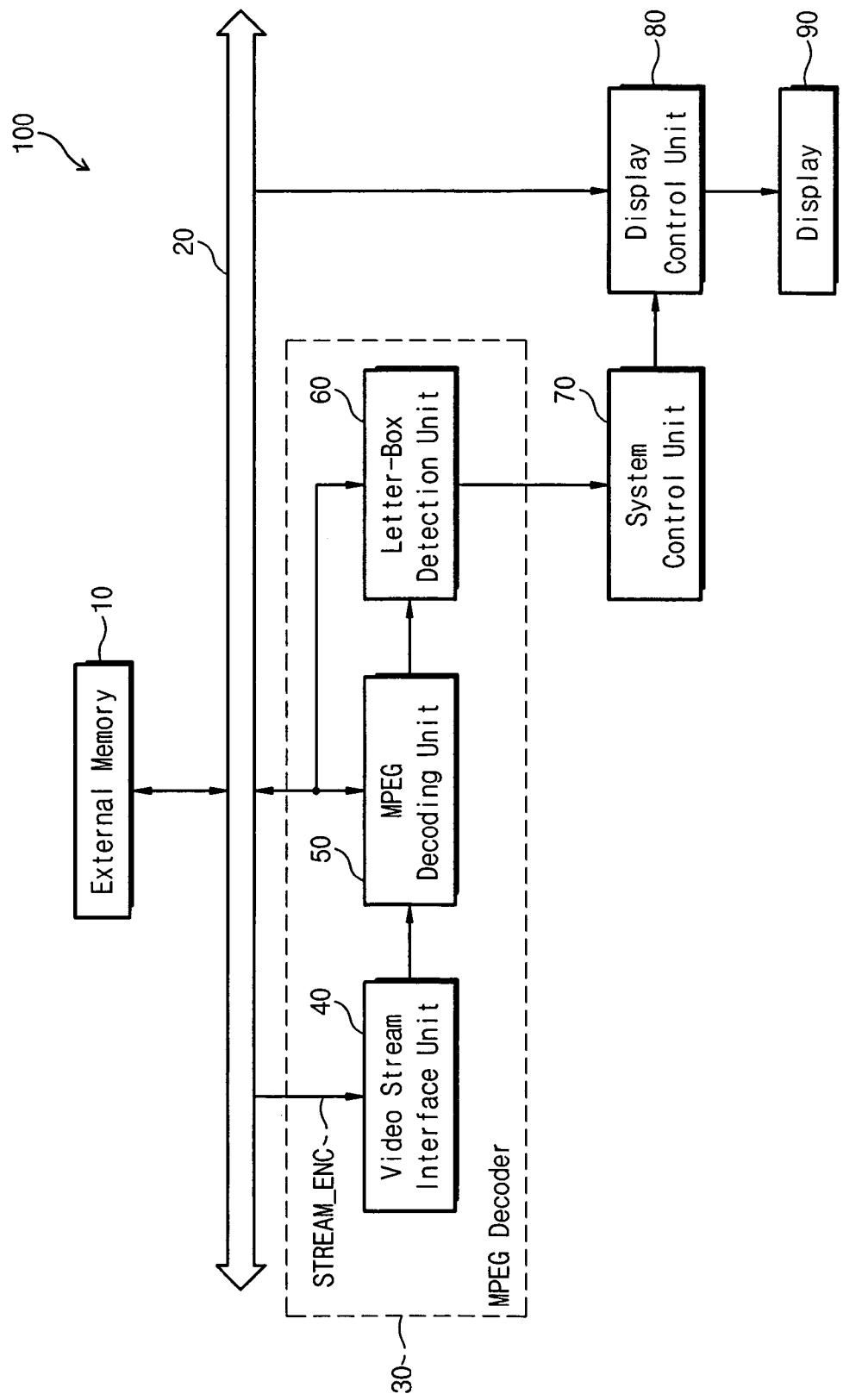

Fig. 6

| 221 | 222 | 223 |
|---|---|---|
| A0 | B0 | C0 |
| A1 | B1 | C1 |
| ⋮ | ⋮ | ⋮ |
| A15 | B15 | C15 |
| MB_A | MB_B | MB_C |

APPARATUS AND METHOD FOR DETECTING LETTER BOX, AND MPEG DECODING DEVICE HAVING THE SAME

CROSS-REFERENCE TO RELATED APPLICATIONS

This U.S. non-provisional patent application claims priority under 35 U.S.C. §119 of Korean Patent Application 2004-37813 filed on May 27, 2004, the entire contents of which are hereby incorporated by reference.

BACKGROUND OF THE INVENTION

The present invention is concerned with MPEG decoding technology, and more specifically relates to an apparatus and method for detecting a letter box for an MPEG decoder.

FIGS. 1A through 1C illustrate a letter box processing feature whereby video signals of a 16:9 aspect ratio are converted into video signals of a 4:3 aspect ratio in an encoder, and an complementary feature where video signals of a 4:3 aspect ratio, containing a letter box, are converted into video signals of a 16:9 aspect ratio.

Most existing televisions are configured for display in the 4:3 aspect ratio. Accordingly, images for display that have the 16:9 aspect ratio as shown in FIG. 1A are first converted into images of 4:3 aspect ratio as shown in FIG. 1B, which is referred to as an MPEG encoding operation. In this case, in order to match the different aspect ratios of images to each other, a standard of MPEG-2 referred to as Pan-Scan is used or images are encoded by inserting invalid image data into upper and lower areas of images, for example into letter box regions a and a'.

However, in the case where the image shown in FIG. 1B is decoded and injected on a screen having a 16:9 or 4:3 aspect ratio, while the image matches with the aspect ratio of the 4:3 screen, an image mismatch occurs with the aspect ratio on the 16:9 screen, so that left and right regions of the screen do not correspond to pixel values of decoding image. Accordingly, a screen without left and right regions b and b' is displayed or an image is injected thereon after interpolation, resulting in an unnatural image pattern. Also, since ineffective images appear at the upper and lower regions, a and a', or appear at the left and right regions, b and b', space on the screen display is wasted. In addition, for a television employing a CRT (Cathode-Ray Tube) as a monitor, a same pixel value is continuously output, which can cause screen damage.

In this case, when a decoded image is displayed on a screen, if images a and a' inserted upon encoding are removed, and therefore an original 16:9 image is injected on the 16:9 screen, it is possible to watch an image that has not yet been encoded in its original state. However, since it is impossible for the MPEG decoder to identify the size of the image inserted upon encoding the MPEG, the resulting size of the image is selected by a user in accordance with his own reference using a predetermined size. Furthermore, as the numerical value is incorrect, this technique is ineffective in image reproduction. Therefore, in order to display a correct image in accordance with the aspect ratio of the screen, it is important to correctly detect the size of the letter box a and a' inserted into the upper and lower regions upon encoding.

SUMMARY OF THE INVENTION

The present invention is directed to an apparatus and method for detecting a letter box capable of correctly displaying a decoded screen according to an aspect ratio by correctly detecting the size of the letter box that is inserted in an image, and an MPEG decoding device using the same.

In one aspect, the present invention is directed to a method for detecting a letter box, comprising the steps of: performing processing area filtering for selecting a processing area of an image used to detect the letter box; performing intra-macroblock filtering for determining the letter box area based on a change level of pixels in macroblocks in one line of the image from the processing area; performing impulse data filtering for excluding the line being detected a high frequency component from the determined letter box area; performing inter-macroblock filtering for determining the letter box area based on a change level of lines between macroblocks of the image; performing inter-line filtering for determining a boundary of the letter box based on an average of the pixel values of the lines; and performing inter-picture filtering for outputting a boundary value of the letter box that has the highest frequency number as the boundary of the letter box in successive images.

In one embodiment, the method for detecting a letter box is performed after decoding operations for the image have been performed.

In another embodiment, the method for detecting a letter box is performed in units of a plurality of macroblocks included in the image.

In another embodiment, the processing area filtering step excludes a boundary part of the image where there may exist unusual pixels in the image.

In another embodiment, the intra-macroblock filtering step includes the sub-steps of: calculating difference values between pixels in one line with respect to a plurality of macroblocks of the image; calculating pixel variations every one line with respect to the macroblocks on the basis of the difference value; calculating a change level value of the pixels in one line of the image on the basis of the change level value of the pixels in one line with respect to the macroblocks; comparing the change level value of the image in one line of the image with a first threshold value; and determining that the corresponding line is not included in the letter box area when the change level value of the image in one line of the image is higher than the first threshold value.

In another embodiment, the difference value between pixels corresponds to a difference value between pixels existing in positions separated by a desired distance on the same line of the macroblock.

In another embodiment, the impulse data filtering step includes the sub-steps of: comparing the difference values between pixels in one line calculated in the intra-macroblock filtering step with a second threshold value; and determining that the corresponding line does not belong to the letter box area when the difference value between the pixels is higher than the second threshold value.

In another embodiment, the inter-macroblock filtering step includes the sub-steps of: calculating the sum of pixels in one line with respect to each of a plurality of macroblocks of the image; calculating a change level value in one line of each block by comparing an average of the sum of pixels in one line of the calculated macroblocks with an average of the sum of pixels in one line of adjacent macroblocks; calculating a change level value in one line of the image on the basis of the change level value of the macroblocks; comparing the change level value in one line of the image with a third threshold value; and determining that the corresponding line does not belong to the letter box area if the change level value in one line of the image is higher than the third threshold value.

In another embodiment, the inter-line filtering step includes the sub-steps of: calculating an average of pixels included in the line; comparing an average value of pixels of the line with the average value of pixels of the previous line; and determining that the corresponding line does not belong to the letter box area if a difference between the average values is higher than a desired threshold value.

In another aspect, the present invention is directed to an apparatus for detecting a letter box, including a processing area filter for selecting a processing area of an image used to detect the letter box; an intra-macroblock filter for calculating a change level of pixels in one line of the image from the processing area in the macroblock, and determining whether the corresponding line belongs to the letter box area by comparing the calculated change level of the pixel in one line with a first threshold value; an impulse data filter for detecting a high frequency component from the line determined to be included in the letter box in the intra-macroblock filter; an inter-macroblock filter for calculating a change level of an image with respect to the line that does not have the high frequency component between macroblocks, and determining whether the corresponding line belongs to a letter box area by comparing the change level of the image in one line with a third threshold value; an inter-line filter for determining a boundary of the letter box by comparing the line determined to be included in the letter box in the inter-macroblock filter with an average of the pixel values of adjacent lines; and an inter-picture filter for repeatedly performing operations of the processing area filter, the intra-macroblock filter, the impulse data filter, the inter-macroblock filter, and the inter-line filter as many times as the number of the image previously set, and outputting a boundary value of the letter box that has the highest frequency number among the performed results. In one embodiment, the letter-box detection is performed after all of decoding operations for the image have been performed.

In another embodiment, the filtering is performed in units of a plurality of macroblocks included in the image.

In another embodiment, the processing area filter excludes a boundary part of the image where there may exist unusual pixels in the image.

In another embodiment, the intra-macroblock filter calculates difference values between pixels in one line with respect to a plurality of macroblocks that construct the image, compares the change level value of pixels in one line of the calculated macroblocks on the basis of the difference value with the first threshold value, and determines that the corresponding line does not belong to the letter box area if the change level value of pixels in one line of the image is higher than the first threshold value.

In another embodiment, the difference value between pixels is a difference value between pixels existing in positions separated by a desired distance on the same line of the macroblock.

In another embodiment, the impulse data filter compares the difference value between the pixels with the second threshold value, and determines that the corresponding line does not belong to the letter box area if the difference value between the pixels is higher than the second threshold value.

In another embodiment, the inter-macroblock filter calculates the change level value of each macroblock in one line by comparing an average of a sum of pixels of each of a plurality of macroblocks of the image and a sum of pixels in one line of adjacent macroblocks, compares the change level value in one line of the image calculated on the basis of the change level value in one line with the third threshold value, and determines that the corresponding line does not belong to the letter box area if the change level value of the image is higher than the third threshold value.

In another embodiment, the inter-line filter compares the average value of the pixel of the line with the average value of the pixel of the previous line, and determines that the corresponding line does not belong to the letter box area if the difference between the average values is higher than a fourth threshold value.

In another aspect, the present invention is directed to an MPEG decoding device, comprising a decoding unit for decoding an image including a letter box; a letter-box detection unit for extracting a processing area of the decoded image, and determining whether the corresponding line belongs to a letter box area by calculating a change level of pixels of the image and a change level of a line of the image in unit of a plurality of macroblocks included in the extracted processing area; and an image display control unit for responding to the letter-box detection result, and controlling and displaying the size of the image; wherein the letter-box detection unit performs a letter-box detection operation as many times as the number of the detection previously set and outputs a letter box boundary value having the highest frequency number.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention. In the drawings:

FIG. 2 is a block diagram of an MPEG decoding device in accordance with an embodiment of the present invention;

FIG. 6 is a diagram explaining a filtering procedure of the inter-macroblock filter shown in FIG. 3.

DETAILED DESCRIPTION OF PREFERRED EMBODIMENTS

Figure 1A:
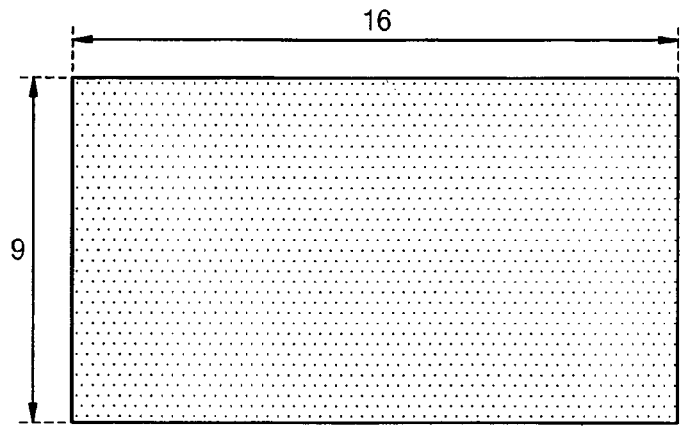
FIGS. 1A through 1C are diagrams illustrating a letter box processing feature where video signals of 16:9 aspect ratio are converted into video signals of 4:3 aspect ratio in an encoder, and an exemplary feature where video signals of 4:3 aspect ratio, containing a letter box, are converted into video signals of 16:9 aspect ratio.
Figure 1B:
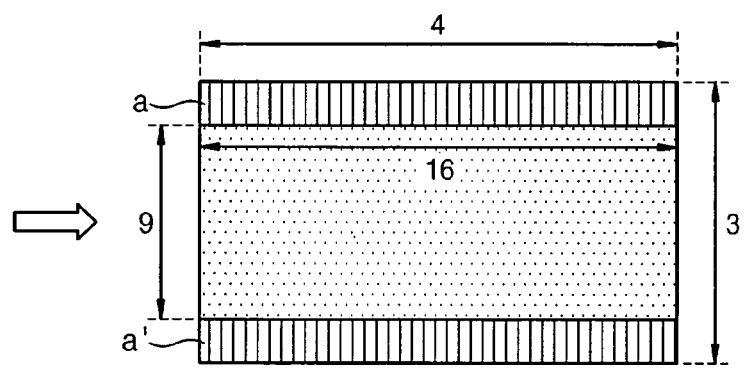
Figure 1C:
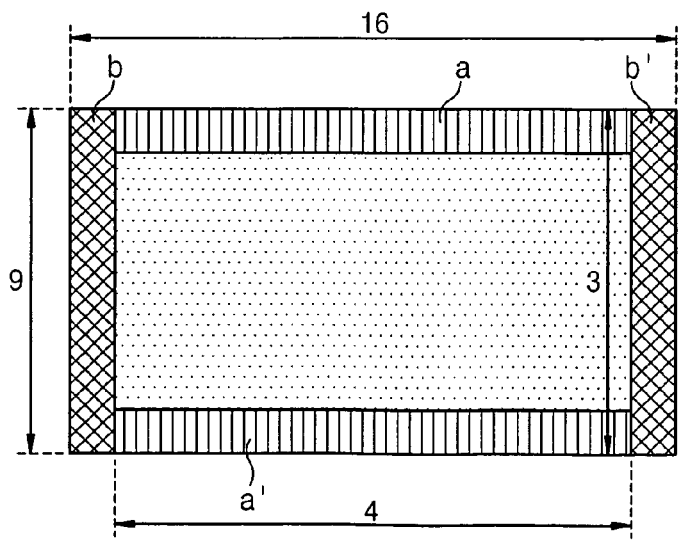

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the invention to those skilled in the art. Like numerals refer to like elements throughout the specification.

Hereinafter, an exemplary embodiment of the present invention will be described in conjunction with the accompanying drawings.

According to a novel apparatus and method for detecting a letter box in accordance with the present invention, an MPEG decoding device performs a decoding of an image, and then detects the size of the letter box inserted into the image through a six step filtering process without affecting the result of the decoding and without requiring additional memory access operations. As a result, it is possible to correctly display the decoded image according to the aspect ratio.

FIG. 2 is a block diagram illustrating an MPEG decoding device 100 in accordance with a preferred embodiment of the present invention.

Referring to FIG. 2, the MPEG decoding device 100 in accordance with the present invention decodes an encoded bit stream STREAM_ENC, detects the size of the letter box inserted into the image, and adjusts and outputs the decoded image to be matched with the screen aspect ratio of a display unit 90. As a result, the decoded image can be correctly displayed according to the screen aspect ratio of the display unit 90.

In order to accomplish the correct display, the MPEG decoding device 100 includes an external memory 10 that is used as a video memory for storing image data; a bus 20 connected to each of logic units included in the MPEG decoding device 100 and used as a path for transceiving signal and data information; an MPEG decoder 30 for decoding the encoded MPEG bit stream STREAM_ENC; a system control unit 70 for controlling all of operations of the MPEG decoding device 100; and a display control unit 80 for adjusting and outputting the decoded result to be matched with the screen aspect ratio of the display unit 90.

The MPEG decoder 30 is composed of a video stream interface unit 40 for interfacing to the encoded bit stream STREAM_ENC; an MPEG decoding unit 50 for performing a decoding operation of the encoded bit stream STREAM_ENC; and a letter-box detection unit 60 for detecting a letter box inserted into the image upon encoding, wherein the MPEG decoder 30 performs a decoding operation of image, and an operation of detecting the size of the letter box inserted into the image.

After the MPEG decoding unit 50 performs a series of decoding procedures (for example, an Inverse Discrete Cosine Transform: IDCT), and a motion compensation procedure, the letter-box detection unit 60 reads out data used to store the decoded data in the external memory and detects the size of the letter box existing in the image. The letter box information detected in the letter-box detection unit 60 is transmitted to the display control unit 80 through the system control unit 70. The display control unit 80 responds to a control signal and the letter box information input from the system control unit 70 and adjusts and outputs the decoded image to be matched with the screen aspect ratio of the display unit 90.

In accordance with the present invention, each of the filters of the letter-box detection unit 60 is constructed of dedicated hardware in order to optimize its speed, data storage space and the like. However, it is possible to embody a letter-box detection function on a computer readable recording medium as computer readable code. The computer readable recording medium includes all kinds of recording apparatuses in which data that can be read by a computer system are stored, and examples of the computer readable recording medium include a ROM, a RAM, a CD-ROM, a magnetic tape, a floppy disk, an optical data storage apparatus, and the like. Also, the computer readable recording medium can be distributed by the computer system connected by a network, and stored and implemented as the computer readable code using a distribution scheme.

Figure 3:
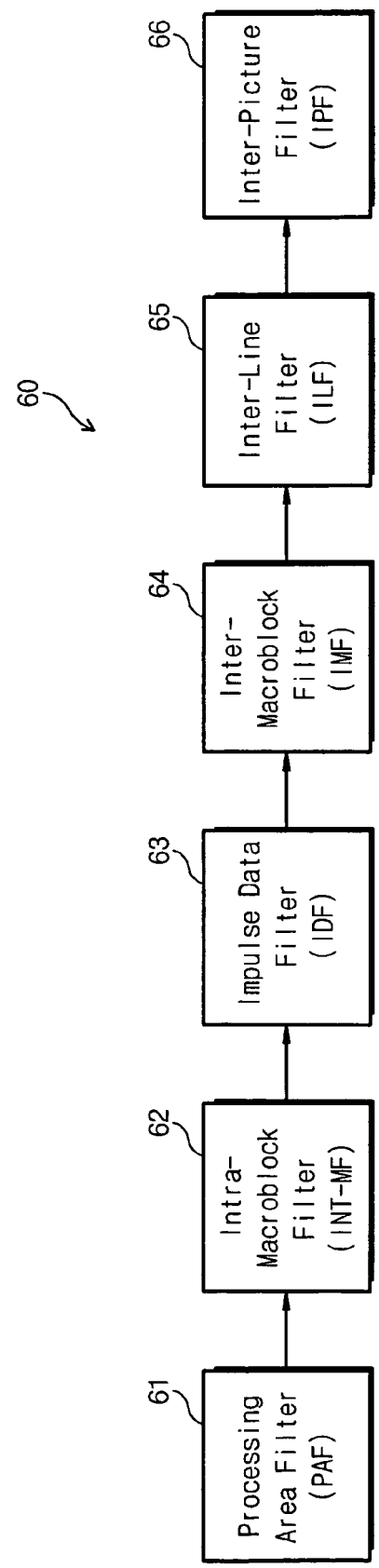
FIG. 3 is a block diagram of a letter-box detector in accordance with an embodiment of the present invention.

FIG. 3 is a block diagram of the letter-box detection unit 60 in accordance with an embodiment of the present invention shown in FIG. 2.

Referring to FIG. 3, the letter-box detection unit 60 in accordance with the present invention includes a processing area filter (PAF) 61, an intra-macroblock filter (INT_MF) 62, an impulse data filter (IDF) 63, an inter-macroblock filter (IMF) 64, an inter-line filter (ILF) 65, and inter-picture filter (IPF) 66.

Conventional types of letter-box detection units read out pixels in units of lines from the external memory 10 and process pixels in units of lines. However, since the MPEG operation performs lossy compression in units of macroblocks, a changing level of the pixel value is changed in units of macroblocks. Accordingly, the present invention increases precision for detecting a letter box by performing five steps of filtering in unit of the macroblocks in consideration of such an MPEG property. Particularly, since the letter-box detection unit 60 in accordance with the present invention detects the letter box by searching for a signal that appears upon storing the final pixel value occurring when the MPEG decoder finishes the decoding operation, the operation of the unit 60 does not adversely affect system performance. Operations of each filter of the letter-box detection unit 60 having such a construction will be described as follows.

Figure 4:
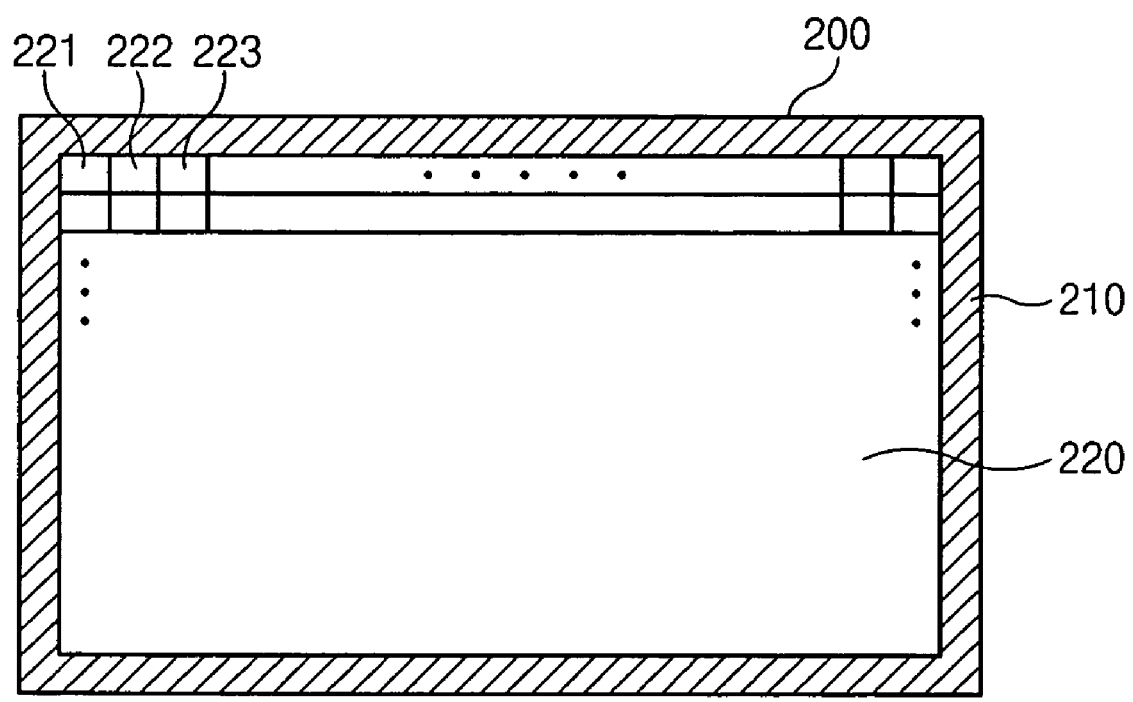
FIG. 4 is a diagram illustrating an image construction to be used to detect a letter box and a filtering procedure performed by the processing area filter shown in FIG. 3.

FIG. 4 is a view showing a construction of an image to be used to detect the letter box and a filtering procedure of the processing area filter 61 shown in FIG. 3.

Referring to FIG. 4, the processing area filter 61 performs a function to exclude an edge part of the image where there abnormal pixels of the decoded image 200 may exist and to select a processing area 220 where stable data exist. As the data are processed in several steps to encode and decode the image, there may be abnormal pixels in the edge area 210 of each image. Accordingly, the present invention increases the precision for detecting a letter box by excluding the edge area 210 of the image where the abnormal pixels may exist from the letter box using the processing area filter 61.

Figure 5:
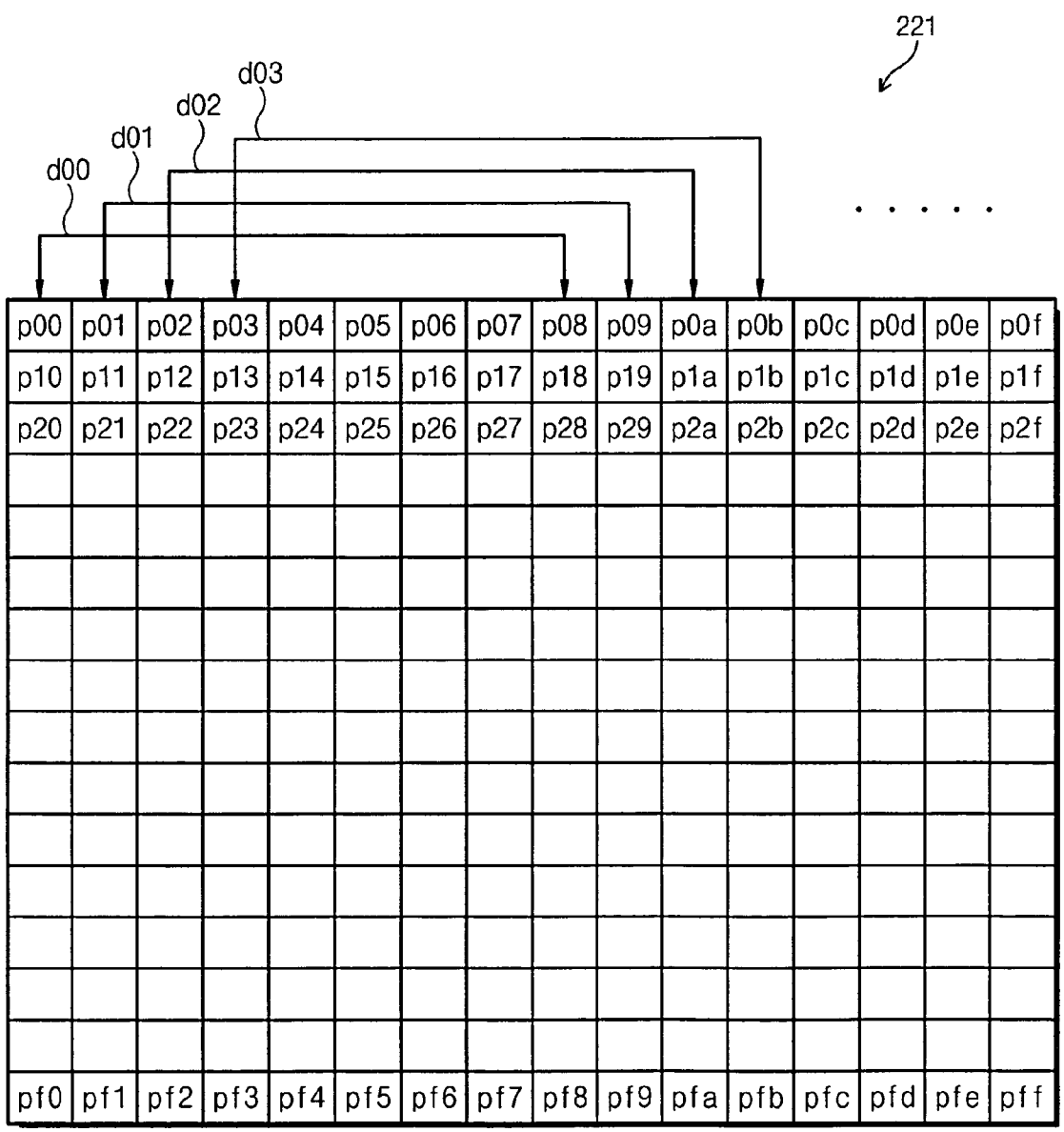
FIG. 5 is a diagram illustrating a construction of the macroblock shown in FIG. 4 and a filtering procedure by the intra-macroblock filter shown in FIG. 3.

FIG. 5 illustrates a construction of the macroblock shown in FIG. 4 and filtering procedures of the intra-macroblock filter 62 shown in FIG. 3.

Referring to FIGS. 4 and 5, the intra-macroblock filter 62 calculates differences between pixels d00, d01, . . . , df6, df7 in one line of each macroblock 221 included in the effective data area selected through the processing area filter 61, and measures a change level of pixel NO_MB_LB in one line of the macroblock on the basis of the calculated differences between pixels d00, d01, . . . , df6, df7. After the NO_MB_LB value in one line of the image is obtained by summing NO_MB_LB values in one line of several macroblocks, it is determined whether an arbitrary line is included in the letter box by comparing the NO_MB_LB in one line of the image with a desired threshold TH_NUM_INTRA_LINE_MB. A filtering procedure performed in the intra-macroblock filter 62 is described in detail as follows.

The image 220 filtered by the processing area filter 61 is constructed of a plurality of macroblocks 221, 222, 223, as shown in FIG. 4, and each of the plurality of macroblocks 221, 22, 223, is constructed of 16*16 pixels as shown in FIG. 5.

First, the intra-macroblock filter 62 is used to calculate the difference between pixels d00, d01, . . . df6, df7 in one line of each macroblock 221. At this time, the calculated difference between pixels d00, d01, . . . df6, df7 and corresponding relationships between pixels is as follows.

$$d00=|p00-p08|, d01=|p01-p09|$$

$$d02=|p02-p0a|, d03=|p03-p0b|$$

$$d04=|p04-p0c|, d05=|p05-p0d|$$

$$d06=|p06\text{'}p0e|, d07=|p07-p0f|$$

$$d10=|p10-p18|, d11=|p11-p19|$$

$$d12=|p12-p1a|, d13=|p13-p1b|$$

$$d14=|p14-p1c|, d15=|p15-p1d|$$

$$d16=|p16-p1e|, d17=|p17-p1f|$$

$$df0=|pf0-pf8|, df1=|pf1-pf9|$$

$$df2=|pf2-pfa|, df3=|pf3-pfb|$$

$$df4=|pf4-pfc|, df5=|pf5-pfd|$$

$$df6=|pf6-pfe|, df7=|pf7-pff| \quad \text{[Equation 1]}$$

Here, the reason why obtaining the difference between a pixel and a pixel separated by 8 pixels from the first one instead of obtaining the difference between adjacent two pixels is that the inverse discrete cosine transform (IDCT) is performed in units of 8×8, and obtaining the difference (that is, a change) between a pixel in an arbitrary block and a pixel belonging to another block is available to more precisely detect a letter box.

After differences between pixels in one line d00, d01, . . . df6, df7 of each of macroblock 221 are calculated in the Equation 1, the number of differences between pixels in one line d00, d01m, . . . df6, df7 higher than a desired threshold value TH_INTRA_MB is obtained in Equation 2 (NUM [(From d00 to d07)>TH_INTRA_MB]), and it is determined whether the obtained number is higher than the desired threshold value TH_NUM_INTRA_MB. If it is determined that the obtained number is higher than the threshold value as a result of the determination, a change level of pixel of the macroblock NO_MB_LB in one line is calculated by increasing the count value one by one. Such a calculation is performed in each line of each macroblock.

$$\text{If } NUMI[(\text{From } d00 \text{ to } d07)>TH\_INTRA\_MB]>TH\_NUM\_INTRA\_MB$$

$$NO\_MB\_LB=NO\_MB\_LB+1 \quad \text{[Equation 2]}$$

Here, as the change level value of the pixel of the macroblock NO_MB_LB in one line increases, the probability that the corresponding line is not a letter box becomes higher.

After both procedures of Equations 1 and 2 and are performed in each line of each macroblock, the change level between pixels NO_MB_LB in one line for one row line of the image formed of a plurality of macroblocks is calculated. The change level between pixels NO_MB_LB in each line of an image is calculated by summing change levels between pixels in each line of a plurality of macroblocks 221, 222, 223, . . . that are arranged in a horizontal direction (that is, in a row direction) of an image.

After the change level between pixels NO_MB_LB in one line of an image is calculated, a change level between pixels NO_MB_LB in one line of an image is compared with a desired threshold value TH_NUM_INTRA_LINE_MB and it is determined whether the corresponding line belongs to a letter box area.

$$NO\_MB\_LB \text{ in one line}>TH\_NUM\_INTR\_LINE\_MB \quad \text{[Equation 3]}$$

When the change level between pixels NO_MB_LB in one line of an image is higher than a desired threshold value TH_NUM_INTRA_LINE_MB as a result of the comparison in Equation 3, it is determined that the corresponding line is not a letter box (that is, determined as an active area). Also, when the change level between pixels NO_MB_LB in one line of an image is lower than the desired threshold value TH_NUM_INTRA_LINE_MB as a result of the comparison in Equation 3, the corresponding line can be an indication of the presence of a letter box.

When filtering of the intra-macroblock filter 62 is completed, filtering for the pixel selected as a letter box is performed by an impulse data filter 63. The impulse data filter 63 operates to supplement the intra-macroblock filter 62. That is, the intra-macroblock filter 62 determines a letter box by measuring the number of changed pixels in the macroblock, and the impulse data filter 63 determines a letter box by measuring the change in the level of the pixel. The impulse data filter 63 detects a high frequency component in an image, where it is determined that a line having at least one of pixels having a high frequency component is not a letter box area.

This is because an MPEG image is processed in a pre-processing procedure such as a low pass filter LPF and the like before it is encoded and most of impulse noise is thus removed. Also, since a noise characteristic of the noise that occurs due to loss compression in the MPEG removes a high frequency component between pixels, if there exists at least one of pixels that have a severe difference in a portion corresponding to the letter box in the intra-macroblock filter 62, the probability is higher that the line is a letter box. Accordingly, the impulse data filter 63 determines whether the differences between pixels d00, d01, . . . d0f obtained by the Equation 1 are higher than a desired threshold value TH_MAX_DIFF_PIX (that is, whether there exists a high frequency component). If the differences between pixels d00, d01, . . . d0f are higher than the desired threshold value TH_MAX_DIFF_PIX (that is, if there exists the high frequency component) as a result of the determination, it is determined that the corresponding line is not a letter box. The filtering procedure of the impulse data filter 63 is also performed for all lines included in each macroblock.

Following filtering by the impulse data filter 63, the letter-box detection unit 60 in accordance with the present invention performs filtering by the inter-macroblock filter 64.

FIG. 6 is a view explaining a filtering procedure of the inter-macroblock filter 64 shown in FIG. 3.

Referring to FIGS. 4 and 6, the inter-macroblock filter 64 calculates the sum A0-A15, B0-B15, C0-C15, . . . of pixels in one line of each of macroblocks 221, 222, 223, . . . , and change levels NO_MB_LB 1 in one line of each macroblock are obtained on the basis of the calculated sum A0-A15, B0-B15, C0-C15, . . . of pixels in one line of each of the macroblocks, and an average of adjacent macroblocks. Also, a change level NO_MB_LB1 in one line of an image is obtained by summing change levels NO_MB_LB1 in one line of a plurality of macroblocks, and then it is determined whether the corresponding line belongs to a letter box area by comparing the change level of macroblocks NO_MB_LB 1 in one line with a desired threshold TH_NUM_INTER_MB. The filtering procedure performed in an inter-macroblock filter 64 is as follows.

An image from which a letter box is detected is constructed of a plurality of macroblocks 221, 222, 223, . . . and each of macroblocks 221, 222, 223, . . . is constructed of 16 lines that each include 16 pixels. First, the inter-macroblock filter 64 calculates the sum A0-A15, B0-B15, C0-C15, . . . of pixels in one line of the macroblocks 221, 222, 223, . . . . . . Here, A0 indicates the sum of pixels of a first line of a first macroblock 221 (that is, A0=p00+p01+p0e+p0f), and B0 indicates the sum of pixels of the first line of the second macroblock 222. Also, the summation of lines of the macroblock is performed in each macroblock.

After the sums A0-A15, B0-B15, C0-C15, . . . of pixels in one line of each macroblock are calculated, the difference between calculated sum of pixels in one line of one macroblock and an average value of surrounding macroblocks adjacent to the macroblock is obtained, and the difference is compared with a desired threshold value TH_INTER_MB and then the change level in one line between the macroblocks is obtained as shown in Equation 4.

If $|AVE(A0, B0 . . .)-C0|>TH\_INTER\_MB$ $NO\_MB\_LB1=NO\_MB\_LB1+1$ [Equation 4]

Here, as the change level value NO_MB_LB1 in each line between the macroblocks increases, the probability that the corresponding line is not a letter box becomes higher. The calculation and comparison for the change level NO_MB_LB 1 in one line of the macroblock are performed with respect to each of all macroblocks.

At this time, if it is determined that the change level in one line of each macroblock is higher than a desired threshold value TH_INTER_MB, this means that the probability that the corresponding line of the corresponding macroblock is not a letter box becomes higher. Accordingly, when the change in one line of one macroblock is compared with that of a surrounding macroblock, the comparison is performed without including the corresponding line of the corresponding macroblock. For example, in the case where the difference between a sum C0 of the first line of third macroblock 223 and an average value of the sums A0 and B0 of first lines of adjacent macroblocks 221 and 222 is higher than the desired threshold value TH_INTER_MB, the sum C0 of the first line of the third macroblock 223 is not used when the comparison and sum operation are performed with respect to a first line of the fourth macroblock. At this time, the sum of the pixels of the first line of the fourth macroblock is compared with the average value of the sums A0 and B0 of the first line of the first and second macroblocks 221 and 222 excluding the sum C0 of the first line of the third macroblock 223.

When the procedure of Equation 4 is completed in one line of each macroblock, the change level between macroblocks NO_MB_LB1 in one line of an image formed on a plurality of macroblocks is calculated. The change level between macroblocks NO_MB_LB1 in one line for an image is calculated as a sum of change NO_MB_LB1 in one line of the plurality of macroblocks 221, 222, 223, . . . that are arranged in a width direction (that is, in a row direction) of the image.

Subsequently, the change level between macroblocks NO_MB_LB1 in one line for an image is compared with a desired threshold value TH_NUM_INTER_MB and it is determined whether the corresponding line belongs to a letter box area.

$NO\_MB\_LB1$ in one line$>TH\_NUM\_INTER\_MB$ [Equation 5]

As a result of the comparison in Equation 5, when the change level between macroblocks NO_MB_LB1 in one line for an image is higher than the desired threshold value TH_NUM_INTER_MB, it is determined that the corresponding line is not a letter box (that is, the line is an active area). As a result of comparison result of the Equation 5, when the change level between pixels NO_MB_LB1 in one line for an image becomes lower than the desired threshold value TH_NUM_INTER_MB, this indicates that the corresponding line can be a letter box.

Returning to FIG. 3, the inter-line filter 65 next searches for an average of pixel values of adjacent lines in an image and determines a boundary of the letter box in accordance with a characteristic that the letter box area is constructed of lines in which a desired interval has continuous values.

If $|AVE(\text{current line})-AVE(\text{previous line})|>TH\_LINE\_BY\_LINE$ [Equation 6]

In Equation 6, when the difference between the average value of pixels of a current line and that of pixels of a previous line is greater than a desired threshold value TH_LINE_BY_LINE, it is determined that the current line belongs to an area (that is, an active area) whose line is not continuous to the current line. When the difference between the average value of pixels of current line and that of pixels of previous line is lower than a desired threshold value TH_LINE_BY_LINE, it is determined that the current line corresponds to a letter box. At this time, the letter box located on the upper part of the image is searched for whether the continuation is present at the first line, and the letter box located on the lower part of the image is searched for whether the continuation is present at the last line, so that the position of each letter box for each image is determined.

When a letter box for an image is detected using the series of filtering procedures described above, the inter-picture filter 66 determines the number of images pic RANGE from which the letter boxes are detected. When the number of the images whose letter box is detected PIC_RANGE is less than a desired number NUM_PIC_LBD, the series of filtering procedures described above are repeatedly performed until the number of images whose letter boxes are detected PIC_RANGE becomes a desired number NUM_PIC_LBD. When the number of the images whose letter box is detected PIC_RANGE is higher than a desired number NUM_PIC_LBD, an interrupt signal is generated and the size corresponding to the letter box having the highest frequency number among the letter-box detection results performed up to that point in time is output.

Returning to FIG. 2, if the letter-box detection result in each image is output to a system control unit 70 of the MPEG decoding device 100, the system control unit 70 can be overloaded. Accordingly, the inter-picture filter 66 (see FIG. 3) sets a desired number of the letter-box detection, and the letter-box detection result is not output to the system control unit 70 of the MPEG decoding device 100 until the letter box is detected as many times as previously set.

Figure 7A:
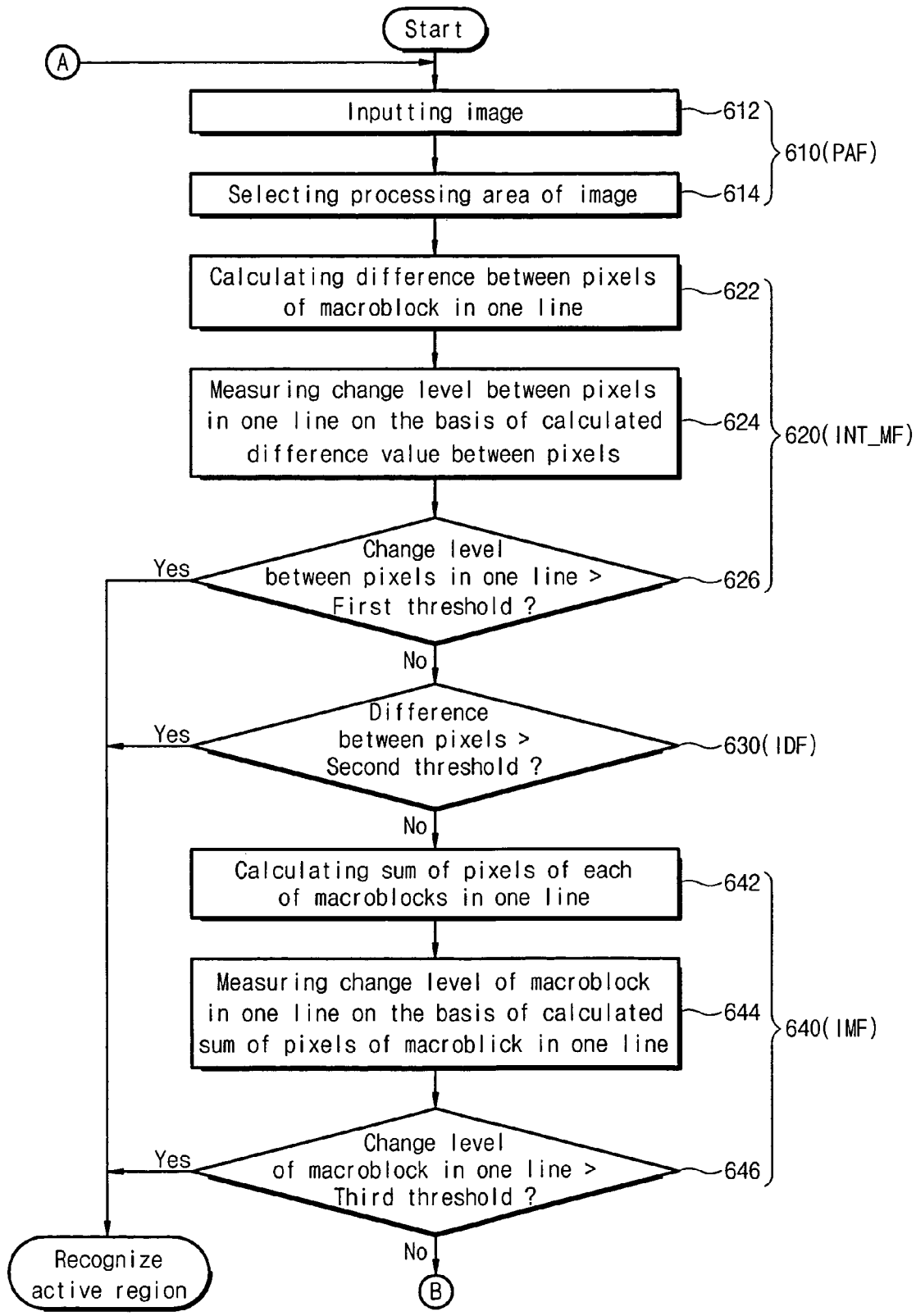
FIGS. 7A and 7B are flow charts that illustrate a method for detecting a letter box in accordance with an embodiment of the present invention.
Figure 7B:
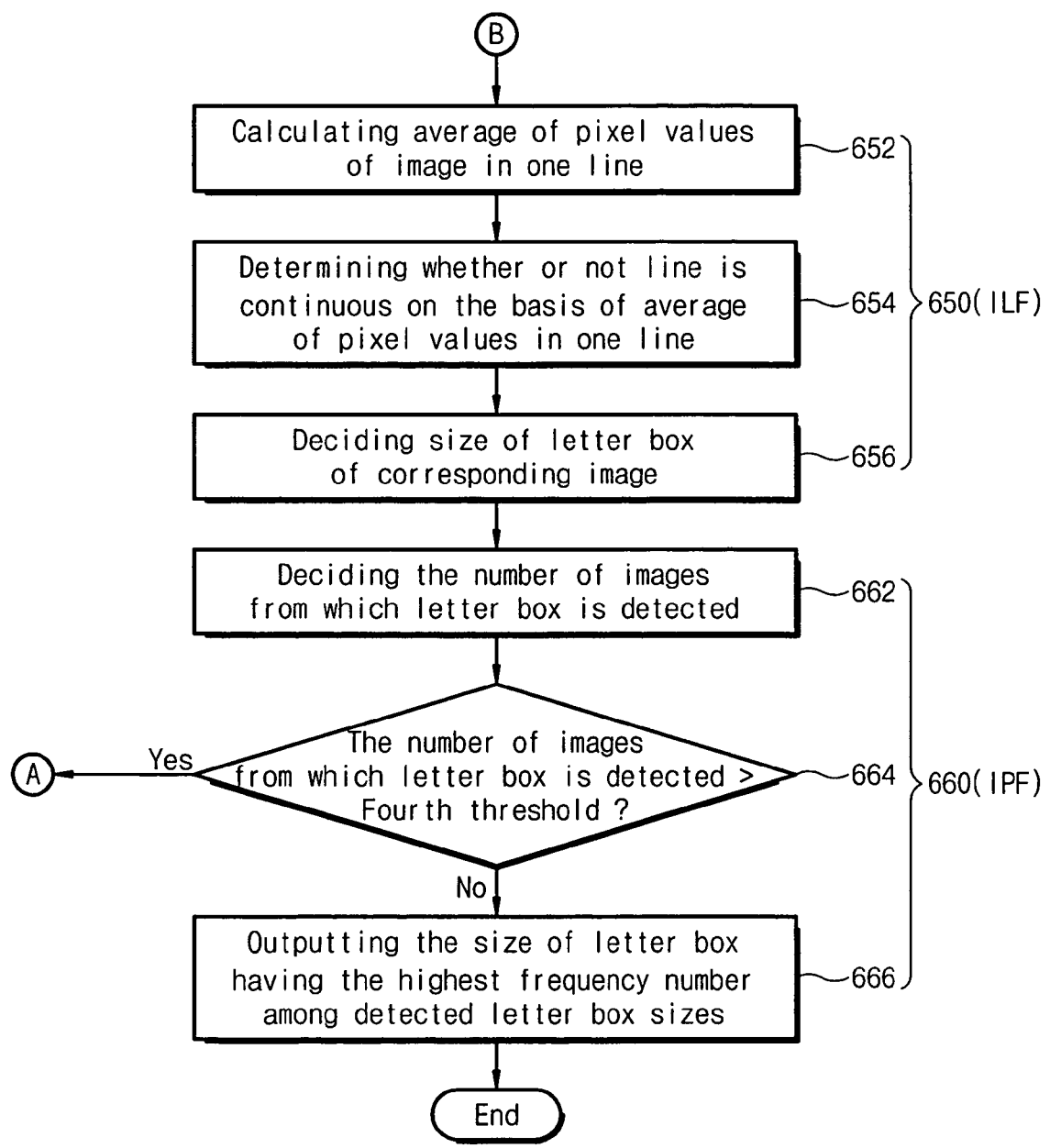

FIGS. 7A and 7B are flow diagrams that a method for detecting a letter box in accordance with an embodiment of the present invention.

Referring to FIGS. 7A and 7B, the method for detecting a letter box in accordance with the present invention, firstly, performs a processing area filtering PAF operation (step 610). The processing area filtering PAF procedure includes the step of receiving an image in which a decoding operation has been completed (step 612), and the step of removing a boundary part of the image and selecting a processing area of the image (step 614).

Subsequently, the intra-macroblock filtering is performed where a change level of the pixel NO_MB_LB in one line is obtained from the difference between the pixels calculated in one line of each macroblock and it is determined whether the corresponding line belongs to the letter box area (step 620). The intra-macroblock filtering procedure (step 620) calculates difference values between the calculated pixels d00, d01, ..., df6, df7 in one line of the macroblock (step 622), and measures the change level between pixels in one line on the basis of the difference values between the calculated pixels d00, d01, ..., df6, df7 (step 624). The change level between pixels in one line measured in the step 624 includes the change level of the pixel in one line of the macroblock NO_MB_LB and the change level of the pixel NO_MB_LB in one line of the image. The change level of the pixel NO_MB_ LB in one line of the image is calculated as a sum of the change levels between pixels NO_MB_LB in one line of a plurality of macroblocks arranged in the width direction (that is, in a row direction) of the image. After the change level between pixels NO_MB_LB in one line of the image is measured in the step 624, the intra-macroblock filtering procedure (step 620) determines whether the change level between pixels in one line of the measured image is higher than the first threshold value TH_NUM_INTRA_LINE_MB, and then whether the corresponding line is a letter box area (step 626). That is, if the change level between pixels in one line of the measured image is greater than the first threshold value TH_NUM_INTRA_LINE_MB as a result of the determination in the step 626, it is determined that the corresponding line is not a letter box. Also, if the change level between pixels in one line of the measured image is less than the first threshold value TH_NUM_INTRA_LINE MB, the corresponding line can be a letter box.

After the intra-macroblock filtering INT_MF is performed in step 620, an impulse data filtering IDF to detect the magnitude of a high frequency component existing in the image is performed (step 630). It is determined whether difference values between pixels calculated in step 622 d00, d01, ... df6, df7 are higher than the second threshold value TH_MAX_DIFF_PIX in the step 630, and then it is determined whether the corresponding line belongs to the letter box area. That is, if the differences between pixels calculated in one line of the macroblock d00, d01, ..., df6, df7 is higher than the second threshold value TH_MAX_DIFF_PIX, it is determined that the corresponding line is not a letter box area (that is, it is determined as an active area). Also, if it is determined that the differences between pixels d00, d01, ..., df6, df7 are lower than the second threshold value TH_MAX_DIFF_PIX, the corresponding line can belong to a letter box area.

Subsequently, the change level of macroblocks NO_MB_LB1 in one line of the image is calculated on the basis of the average of the sum of pixels in one line included in macroblocks and the sum of pixels in one line of adjacent macroblocks, and an inter-macroblock filtering IMF is performed to determine whether the corresponding line belongs to the letter box area (step 640).

In the inter-macroblock filtering step (step 640), sums of pixels in one line for each macroblock A0-A15, B0-B15, C0-Cl5, ... are calculated (step 642). A change level of each macroblock NO_MB_LB1 in one line is obtained by comparing the sums of pixels of the macroblock in one line A0-A15, B0-B15, C0-C15, ... with an average of adjacent macroblocks, and then a change level of macroblocks NO_MB_LB1 in one line of an image by summing the change level of each macroblock in one line and a change level of a plurality of macroblocks in one line NO_MB_LB1 (step 644). Subsequently, it is determined whether the corresponding line belongs to a letter box area by comparing the change level of macroblocks NO_MB_LB1 in one line of the calculated image in the step 644 with the third threshold TH_NUM_ INTER_MB (step 646). If the change level of the macroblocks NO_MB_LB1 in one line of the image is higher than the third threshold TH_NUM_INTER_MB as a result of the determination in the step 646, it is determined that the corresponding line does not belong to a letter box area (that is, the corresponding line is determined to be an active area). If the change level of the macroblocks NO_MB_LB 1 in one line of the image is lower than the third threshold TH_NUM_INTER_MB, the corresponding line can belong to a letter box area.

Following the inter-macroblock filtering of step 640, an inter-line filtering ILF is performed where an average of pixel values of adjacent lines of the image is searched and then a boundary of continuous letter boxes is determined (step 650).

In the inter-line filtering step (step 650), an average value of pixels in one line of the image is calculated (step 652), and it is determined whether a difference between an average value of pixels of a current line and that of the previous line is higher than a desired threshold value TH_LINE_BY_LINE so that it is determined whether the line is continuous (step 654). For example, if the difference between the average value of pixels of the current line and that of the previous line is higher than the desired threshold value TH_LINE_BY_LINE, it is determined that the current line belongs to an area different from the area to which the previous line belongs. Also, if the difference between the average value of pixels of the current line and that of the previous line is lower than the desired threshold value TH_LINE_BY_LINE, it is determined that the current line belongs to a letter box area. And then, a letter box size of the current image is determined according to the result determined in the step 654 (step 656).

As described above, if a letter box size for one image is determined according to a series of filtering procedures performed in the steps 610 to 650, an inter-picture filtering IPF is performed where a letter-box detection is repeatedly performed as many times as previously set (step 660).

In the inter-picture filtering step (step 660), the number of images PIC_RANGE in which steps 610 to 650 are performed is determined (step 662), the determined number of images are searched and it is confirmed whether the number of images whose letter boxes are detected is higher than a fourth threshold NUM_PIC_LBD (that is, it is confirmed whether the letter box is detected as many as previously set (step 664). If the number of the images whose letter boxes are detected is higher than the fourth threshold NUM_PIC_LBD as a result of the determination in step 664, the letter box size having the highest frequency number among the letter-box detection results performed until then is output (step 666).

According to the present invention, if a decoding of an image is performed in an MPEG decoding apparatus, it is possible to perform filtering units of macroblocks and then detect a letter box size inserted in the image. As a result, it is possible to precisely display the decoded image according to the aspect ratio of screen.

While this invention has been particularly shown and described with references to preferred embodiments thereof, it will be understood by those skilled in the art that various changes in form and details may be made herein without departing from the spirit and scope of the invention as defined by the appended claims.

What is claimed is:

1. An apparatus for detecting a letter box, comprising:
  a processing area filter selecting a processing area of an image used to detect the letter box;
  an intra-macroblock filter calculating a change level of pixels in one line of the image from the processing area, and determining whether the corresponding line belongs to the letter box area by comparing the calculated change level of the pixel in one line with a first threshold value;

an impulse data filter detecting a high frequency component from the line determined to be included in the letter box in the intra-macroblock filter;

an inter-macroblock filter calculating a change level of an image with respect to the line that does not have the high frequency component, and determining whether the corresponding line belongs to a letter box area by comparing the change level of the image in one line with a third threshold value;

an inter-line filter determining a boundary of the letter box by comparing the line determined to be included in the letter box in the inter-macroblock filter with an average of the pixel values of adjacent lines; and an inter-picture filter repeatedly performing operations of the processing area filter, the intra-macroblock filter, the impulse data filter, the inter-macroblock filter, and the inter-line filter as many times as the number of the image previously set, and outputting a boundary value of the letter box that has the highest frequency number among the performed results.

2. The apparatus as set forth in claim 1, wherein the apparatus detecting a letter box performs the letter-box detection after all decoding operations for the image have been performed.

3. The apparatus as set forth in claim 1, wherein the apparatus detecting a letter box performs the filtering in units of a plurality of macroblocks included in the image.

4. The apparatus as set forth in claim 1, wherein the processing area filter excludes a boundary part of the image where there may exist unusual pixels in the image.

5. The apparatus as set forth in claim 1, wherein the intra-macroblock filter calculates difference values between pixels in one line with respect to a plurality of macroblocks that construct the image, compares the change level value of pixels in one line of the calculated macroblocks on the basis of the difference value with the first threshold value, and determines that the corresponding line does not belong to the letter box area if the change level value of pixels in one line of the image is higher than the first threshold value.

6. The apparatus as set forth in claim 5, wherein the difference value between pixels is a difference value between pixels existing in positions separated by a desired distance on the same line of the macroblock.

7. The apparatus as set forth in claim 5, wherein the impulse data filter compares the difference value between the pixels with the second threshold value, and determines that the corresponding line does not belong to the letter box area if the difference value between the pixels is higher than the second threshold value.

8. The apparatus as set forth in claim 1, wherein the inter-macroblock filter calculates the change level value of each macroblock in one line by comparing an average of a sum of pixels of each of a plurality of macroblocks of the image and a sum of pixels in one line of adjacent macroblocks, compares the change level value in one line of the image calculated on the basis of the change level value in one line with the third threshold value, and determines that the corresponding line does not belong to the letter box area if the change level value of the image is higher than the third threshold value.

9. The apparatus as set forth in claim 1, wherein the inter-line filter compares the average value of the pixel of the line with the average value of the pixel of the previous line, and determines that the corresponding line does not belong to the letter box area if the difference between the average values is higher than a fourth threshold value.

10. An MPEG decoding device, comprising:

a decoding unit decoding an image including a letter box;

a letter-box detection unit extracting a processing area of the decoded image, and determining whether the corresponding line belongs to a letter box area by calculating a change level of pixels of the image and a change level of a line of the image in unit of a plurality of macroblocks included in the extracted processing area; and an image display control unit responding to the letter-box detection result, and controlling and displaying the size of the image;

wherein the letter-box detection unit performs a letter-box detection operation as many times as the number of the detection previously set and outputs a letter box boundary value having the highest frequency number, wherein the letter-box detection unit includes:

a processing area filter selecting a processing area of an image used to detect the letter box;

an intra-macroblock filter calculating a change level of pixels in one line of the image from the processing area in the macroblock, and determining whether the corresponding line belongs to the letter box area by comparing the calculated change level of the pixel in one line with a first threshold value;

an impulse data filter detecting a high frequency component from the line determined to be included in the letter box in the intra-macroblock filter;

an inter-macroblock filter calculating a change level of an image with respect to the line that does not have the high frequency component between macroblocks, and determining whether the corresponding line belongs to a letter box area by comparing the change level of the image in one line with a third threshold value;

an inter-line filter determining a boundary of the letter box by comparing the line determined to be included in the letter box in the inter-macroblock filter with an average of the pixel values of adjacent lines; and an inter-picture filter repeatedly performing operations of the processing area filter, the intra-macroblock filter, the impulse data filter, the inter-macroblock filter, and the inter-line filter as many times as the number of the image previously set, and outputting a boundary value of the letter box that has the highest frequency number among the performed results.

* * * * *